United States Patent
Borst et al.

(10) Patent No.: US 7,301,329 B2
(45) Date of Patent: Nov. 27, 2007

(54) SENSOR HOLDER AND METHOD FOR THE PRODUCTION THEREOF

(75) Inventors: Peter Borst, Unlingen (DE); Dietmar Barth, Reutlingen (DE)

(73) Assignee: Rolf Prettl, Tuebingen (DE)

( * ) Notice: Subject to any disclaimer, the term of this patent is extended or adjusted under 35 U.S.C. 154(b) by 0 days.

(21) Appl. No.: 11/509,970

(22) Filed: Aug. 24, 2006

(65) Prior Publication Data

US 2007/0057665 A1 Mar. 15, 2007

Related U.S. Application Data

(63) Continuation of application No. PCT/EP2005/001868, filed on Feb. 23, 2005.

(30) Foreign Application Priority Data

Feb. 24, 2004 (DE) .................. 10 2004 010 321

(51) Int. Cl.
  G01B 7/14 (2006.01)
  G01R 33/06 (2006.01)
  G01R 33/09 (2006.01)
  H01L 43/06 (2006.01)
  H01L 43/08 (2006.01)

(52) U.S. Cl. .............................. 324/207.2; 324/207.21; 324/251; 324/252

(58) Field of Classification Search .............. 324/166, 324/173, 174, 179, 207.2, 251; 33/32 R, 33/32 H
See application file for complete search history.

(56) References Cited

U.S. PATENT DOCUMENTS 5,563,510 A 10/1996 Gorrell et al.
5,637,995 A * 6/1997 Izawa et al. ................ 324/174
6,427,316 B1 * 8/2002 Shinjo et al. ............. 29/602.1
2002/0067162 A1 6/2002 Dammkohler et al.
2003/0193328 A1* 10/2003 Iwashita .................. 324/207.2

FOREIGN PATENT DOCUMENTS

| DE | 3827937 A1 | 2/1990 |
|---|---|---|
| DE | 195 46 865 C1 | 10/1996 |
| DE | 195 23 322 A1 | 1/1997 |
| DE | 196 18 538 A1 | 4/1997 |
| DE | 200 18 538 U1 | 3/2002 |
| DE | 101 46 156 A1 | 4/2002 |
| EP | 1 359 424 A2 | 11/2003 |

OTHER PUBLICATIONS

International Search Report for International Application No. PCT/EP2005/001868 filed Feb. 23, 2005.

* cited by examiner

*Primary Examiner*—Reena Aurora
*Assistant Examiner*—Kenneth J Whittington
(74) *Attorney, Agent, or Firm*—Knobbe, Martens, Olson & Bear LLP (57) ABSTRACT

A sensor holder for mounting a sensor component is disclosed. In one aspect, the sensor holder comprises an elongate holding device, at the first axial end of which the sensor component is mounted and at the second axial end of which a junction cable can be led up, the conductors of which can be connected to terminals of the sensor component. In this case, the holding device has a plastic carrier, on which the sensor component is mounted, and the metallic outer carrier, in particular a metal sleeve, surrounding the plastic carrier.

29 Claims, 6 Drawing Sheets

SENSOR HOLDER AND METHOD FOR THE PRODUCTION THEREOF

REFERENCE TO RELATED APPLICATIONS

This application claims priority to and is a continuation of PCT International Application Number PCT/EP2005/001868, filed on Feb. 23, 2005, which claims priority under 35 U.S.C. § 119 to German patent application 10 2004 010 321.6 filed on Feb. 24, 2004. The disclosures of the above-described applications are hereby incorporated by reference in their entirety.

BACKGROUND OF THE INVENTION

1. Field of the Invention

The present invention relates to a sensor holder for mounting a sensor component, in particular a Hall sensor, with an elongate holding device, at the first axial end of which the sensor component is mounted and at the second axial end of which a junction cable can be led up, the conductors of which can be connected to terminals of the sensor component.

The present invention relates, furthermore, to a method for the production of a sensor cartridge for a sensor arrangement or for a sensor component.

2. Description of the Related Art

Sensor holders or sensor cartridges of the generic type have hitherto been produced from what is known as an MIM component (metal injection molding), a type of sintered part. A Hall sensor (and, if appropriate, a measuring circuit) was sealed into this. The sensor cartridge together with the Hall sensor is movable, for example, with respect to a permanent magnet which is part of a sensor arrangement.

However, the component based on the MIM technology is not sufficiently tolerance-compliant. Furthermore, sealing is a highly unreliable process, particularly in the case of the relatively small dimensions of the components which are in question.

SUMMARY OF CERTAIN INVENTIVE ASPECTS

Against the above background, the technical problem on which the invention is based is to specify an improved sensor holder and an improved method for the production thereof, specifically improved particularly with regard to quality, costs and/or reliability.

In the sensor holder initially mentioned, this object is achieved, in a first aspect of the present invention, in that the holding device has a plastic carrier, on which the sensor component is mounted, and a metallic outer carrier, which surrounds the plastic carrier.

The metallic outer carrier may be formed, in particular, by a metal sleeve. Furthermore, it is possible that the outer carrier, which surrounds the plastic carrier, is produced from a material other than metal, for example from plastic.

As a rule, the outer carrier is produced from a nonmagnetic or a magnetic material, in particular from a nonmagnetic or a magnetic metal, in particular from high-grade steel.

The term "junction cable with conductors" is to be understood broadly in the present instance. For example, individual electrical leads may also be led up to the sensor holder and, in the linguistic use of the present application, form a junction cable. The connection between the conductors of the junction cable and the terminals of the sensor component may take place directly, but may also take place via further connecting elements, for example via a measuring circuit board, via an electrical plug connection, etc.

In the invention according to the first aspect, it is particularly advantageous that the Hall sensor is received in a composite component consisting of plastic carrier and of metallic outer carrier, which can be produced cost-effectively and with high reliability. In particular, there is no longer any need for sealing the Hall sensor. The outer carrier may be produced, for example, from metal sheet or a metal piece, so that sufficient tolerance compliance can be achieved.

In a second aspect of the present invention, the sensor holder initially mentioned is developed in that the sensor component is mounted floatingly in the axial direction on the plastic carrier.

It is thereby possible to offset the sensor component in relation to the plastic carrier. In particular, it is possible to arrange the sensor component in a defined position with respect to a metallic outer carrier, so that dimensional or assembly tolerances can be compensated.

Tolerance compliance is also influenced positively as a result of this.

In a third aspect of the present invention, the sensor holder initially mentioned is developed in that the plastic carrier has at the first end an orifice with respect to which a sensor face of the sensor component projects axially.

It is thereby possible for the sensor component mounted in the plastic carrier to be arranged with its sensor face directly on a metallic reference face, for example of the metallic outer carrier.

As a result of this, too, a sensor cartridge with high tolerance compliance, particularly also with regard to the electrical properties, can be implemented.

In a fourth aspect of the present invention, the sensor holder initially mentioned is developed in that at least one terminal pin of the sensor component is injection-molded around with a pin holder consisting of plastic.

Preferably, a plurality of, in particular all the terminal pins of the sensor component are injection-molded around with the pin holder.

The pin holder may in this case perform a plurality of functions. For example, tensile relief can thereby be provided. Also, contacting with conductors of the junction cable can be made easier.

According to a fifth aspect of the present invention, a flexible flat connection device is provided for the electrical connection between the sensor component and a measuring circuit.

It is thereby comparatively simple to mount the sensor component floatingly in the axial direction on the plastic carrier. Such a flexible connection device can also be easily integrated in the plastic carrier.

The flat flexible connection device may be designed, for example, as a flexible film or Starflex connection. Furthermore, in this embodiment, the sensor component may preferably be designed as an SMD component which is contacted directly onto the flat connection device.

Finally, the above object is achieved by means of a method for the production of a sensor cartridge for a sensor arrangement, with the steps a) provision of a sensor component; b) connection of terminals of the sensor component to conductors of a junction cable; c) insertion of the sensor component into a plastic component; and d) surrounding of the plastic carrier with a metal sleeve.

By means of the method according to the invention, a sensor holder or a sensor cartridge can be produced cost-effectively with high tolerance compliance and therefore with a high uniform quality.

In the first aspect of the present invention, it is particularly preferred if the metal sleeve is closed at the first end.

A defined axial relative position between the plastic carrier or sensor component and the metal sleeve can thereby be achieved.

Furthermore, it is in this case advantageous if the metal sleeve is provided with a flanging, in order to secure the plastic carrier to the metal sleeve.

The metal sleeve can thereby be secured to the plastic carrier by means of a simple manufacturing method.

In this case, it is particularly preferred if the flanging presses the plastic carrier axially in the direction of the first end.

What is achieved thereby is that the sensor component mounted at the first end can be pressed in the direction of the preferably closed end of the metal sleeve, in order thereby to achieve a defined relative position. It goes without saying that the flanging is in this case preferably formed at the second end.

According to a further preferred embodiment, the junction cable is led through the second end of the metal sleeve.

Furthermore, it is advantageous if the junction cable is surrounded in the region of the second end by a sealing ring.

The sensor component can thereby be closed off hermetically inside the metal sleeve.

In a further preferred embodiment, the junction cable is injection-molded around at the second end of the metallic outer carrier.

By means of such an injection-molded surround, for example in the form of a macromelt surround, on the one hand, a necessary sealing off in the region of the second end is achieved. On the other hand, such an injection-molded surround can also provide good tensile relief with respect to the junction cable.

It goes without saying that, in the case of an injection-molded surround, as a rule, a separate sealing ring may be dispensed with.

The injection-molded surround, as a rule a plastic material, can in this case engage directly on the metallic outer carrier and the plastic carrier and surround the junction cable.

According to a further preferred embodiment of the first aspect of the present invention, the plastic carrier has a lower part and a cover which are separated from one another by an approximately axially running parting plane.

This makes it possible in a structurally beneficial way to mount the sensor component on the plastic carrier, particularly in that the sensor component is received between the lower part and the cover.

Furthermore, it is advantageous if a first radial web for tensile relief is formed on the plastic carrier.

This makes it possible to connect the sensor component and/or the junction cable under tensile relief.

According to a further embodiment of the first aspect of the invention, the sensor component is mounted immovably on the plastic carrier.

It is particularly preferred, however, if, as in the second aspect of the invention, the sensor component is mounted floatingly in the axial direction on the plastic carrier.

It is in this case particularly advantageous if elastic means are provided in order to prestress the sensor component in the axial direction toward the first end.

What is achieved by this measure is that the sensor component can be prestressed into a defined position.

It is in this case advantageous, furthermore, if the elastic means are formed by a silicone cushion.

Alternatively, however, the elastic means may also be provided by other measures, for example by a plastic spring or the like.

Preferably, however, the elastic means are produced from a nonmagnetic material.

Furthermore, it is advantageous if the elastic means are supported in the axial direction on a radial web, in particular on a radial web of the plastic carrier.

In a further preferred embodiment, the plastic carrier has at the first end an orifice with respect to which a sensor face of the sensor component projects axially.

It is thereby possible to bring the sensor face into direct bearing contact, for example, against a bottom region of the metallic outer carrier, in order thus, overall, to improve the magnetic properties, in particular the tolerance compliance of the magnetic properties.

In this case, it is possible, in general, to press the sensor face against the bottom region of the metallic outer carrier by means of a corresponding prestress of the plastic carrier with respect to the metallic outer carrier.

It is particularly preferred, however, if the sensor face is adhesively bonded to the bottom region of the metallic outer carrier. A high degree of safety with respect to vibrations is thereby achieved. Furthermore, a temperature drift with time can be avoided.

According to a further preferred embodiment, the terminal pins of the sensor component have an axial portion and a radial portion, the terminal pins being secured to the holding device behind the radial portion, as seen from the sensor component.

By a combination of an axial portion and of a radial portion being provided, it is possible in a structurally simple way to mount the sensor component in an axially floating or movable manner, axial movements being absorbed as a result of deflections of the radial portion.

In the sensor holder according to the fourth aspect of the present invention, it is particularly advantageous if the pin holder has at least one recess in which at least one terminal pin is exposed.

It is thereby possible to contact electrically the terminal pin fixed by means of the pin holder.

It is particularly preferred, in this case, if an electrical component which contacts the terminal pin is inserted into the recess.

In this case, the pin holder serves at the same time as a carrier or receptacle for an electrical component which is provided as part of a measuring circuit or for the electrical connection of the sensor component.

It goes without saying in this case that the pin holder preferably has provided in it at least one recess which exposes two separate terminal pins, so that a component which contacts both terminal pins can be inserted.

Furthermore, in the sensor holder according to the fourth aspect of the invention, it is advantageous if ends of the terminal pins project with respect to the pin holder and can be connected electrically to the conductors of the junction cable.

This makes it possible to cause the ends of the terminal pins to project with respect to the pin holder by a preselected distance ideal for electrical connection.

Furthermore, it is in this case advantageous if the pin holder has a depression, into which a radial web of the holding device, in particular of the plastic carrier, engages, in order to provide tensile relief.

It is also advantageous if the holding device has a further radial web with orifices through which ends of the terminal pins are led, said ends projecting with respect to the pin holder.

This, on the one hand, allows a favorable contacting of the terminal pins, specifically at the ends which project with respect to the pin holder and to the orifices. Furthermore, tensile relief is provided in a structurally beneficial way, in that the pin holder can be supported on the further radial web.

In a further embodiment preferred overall, the junction cable is connected to a plug connector and the plastic carrier has a plug connector receptacle for the introduction of the plug connector.

The method for the indirect connection of the conductors of the junction lead to the measuring circuit or to the sensor component can thereby be facilitated. The plug connector can subsequently be injection-molded around in the plug connector receptacle.

It is in this case particularly advantageous if the plastic carrier has an extension which extends out of the metallic outer carrier at the second end.

As a result, compact dimensions can be maintained for the actual sensor cartridge, that is to say that part of the sensor holder which is surrounded by the metallic outer carrier. By contrast, the extension can be configured such that it can also receive a comparatively large plug connector.

It goes without saying in this case that the plug connector can be received in the plug connector receptacle in a preferably latching manner, in order to provide tensile relief, and can preferably be injection-molded around in the plug connector receptacle, in order to provide the necessary sealing. Furthermore, in this case, the latching connection can be fixed in order thereby to provide the tensile relief permanently.

Although, in an above illustrated embodiment, the sensor component is provided with terminal pins which conductors of the junction cable can also directly contact, the sensor component is designed, according to a preferred alternative embodiment, as an SMD component.

In this case, the SMD component can be premounted on a circuit board carrier before insertion into the plastic carrier, so that manufacture is simplified overall.

This embodiment can be combined particularly beneficially, in particular, with the fifth aspect of the present invention, since a flexible flat connection device may be used in order to contact an SMD component directly to it.

Furthermore, it is advantageous if the plastic carrier has mounted on it a circuit board on which at least part of a measuring circuit is implemented.

This embodiment is advantageous particularly when the flexible flat connection device is used which in this case is connected to the circuit board.

In many instances, the flexible connection device may even be designed directly as a circuit board, so that at least part of the measuring circuit is formed directly on the flexible flat connection device.

In the method according to the invention, it is advantageous if, before step b), terminal pins of the sensor component are injection-molded around with a pin holder consisting of plastic.

This step makes it possible to implement the various functions of the pin holder.

In this case, it is also advantageous if the pin holder has at least one recess in which at least one terminal pin is exposed, and if an electrical component, in particular an SMD component, is inserted into the recess and is connected electrically to the terminal pin.

In the method according to the invention, it is alternatively advantageous if the sensor component is connected to a measuring circuit inside the plastic carrier by means of a flat flexible connection device.

It goes without saying, overall, that the various aspects of the invention may be combined with one another in any desired way, either, for example, one aspect with the other or all the aspects with one another.

A further complex of the invention relates to the combination of a sensor component, which has terminal pins, with a circuit board, on which electronic structural elements for the electrical connection of the sensor component are provided.

In this further aspect of the invention, there is provision for the circuit board or circuit wafer to be oriented perpendicularly with respect to the axial direction, that is to say approximately parallel with the sensor component. The connection takes place in that the terminal pins of the sensor component are bent toward the circuit board.

In this case, it is particularly advantageous if metallically coated depressions, into which the terminal pins can be contacted, are provided on a side edge of the circuit board.

Depressions of this kind can be produced particularly advantageously in that a basic circuit board is provided with, for example, circular through contactings in a way known per se, and if the basic circuit board is subsequently divided into two individual circuit boards in that a cut is made through the through contactings. The through contactings are thereby "opened", so that a connection between the terminal pins and the circuit board can thus be made in a simple way.

It goes without saying that the features mentioned above and those yet to be explained below can be used not only in the combination specified in each case, but also in other combinations or alone, without departing from the scope of the present invention.

BRIEF DESCRIPTION OF THE DRAWINGS

Exemplary embodiments of the invention are illustrated in the drawing and are explained in more detail in the following description. In the drawing.

DETAILED DESCRIPTION OF THE INVENTION

In FIGS. 1-5, a sensor cartridge according to a preferred embodiment of the invention is designated in general by 40.

The sensor cartridge 40 is connected to an electrical junction cable 42 and contains a holding device 43 for a sensor component.

The holding device 43 contains a plastic carrier 44 and a metal sleeve 46 surrounding the plastic carrier 44.

The metal sleeve 46 is closed at a first axial end A. At the second axial end B, the junction cable 42 is led into the metal sleeve 46. The plastic carrier 44 is pushed into the metal sleeve 46 in the direction toward the first axial end A. At the second axial end B, the open end of the metal sleeve 46 is flanged radially inward, this being shown at 48.

A second radial flanging 49 is provided between the two axial ends A, B and serves for the alternative or additional positive securing of the plastic carrier 44 to the metal sleeve 46.

The metal sleeve 46 and the plastic carrier 44 are thus preferably connected positively to one another, specifically by means of one or both of the two following measures:

flanging 48 of the metal sleeve edge, specifically in such a way that the plastic carrier 44 is pressed axially against the bottom of the metal sleeve 46;

radial flanging 49 of the metal sleeve 46 in a region which lies nearer the bottom of the metal sleeve 46. Any dimensional fluctuations of the plastic due to temperature differences can then be absorbed more effectively.

Figure 1:
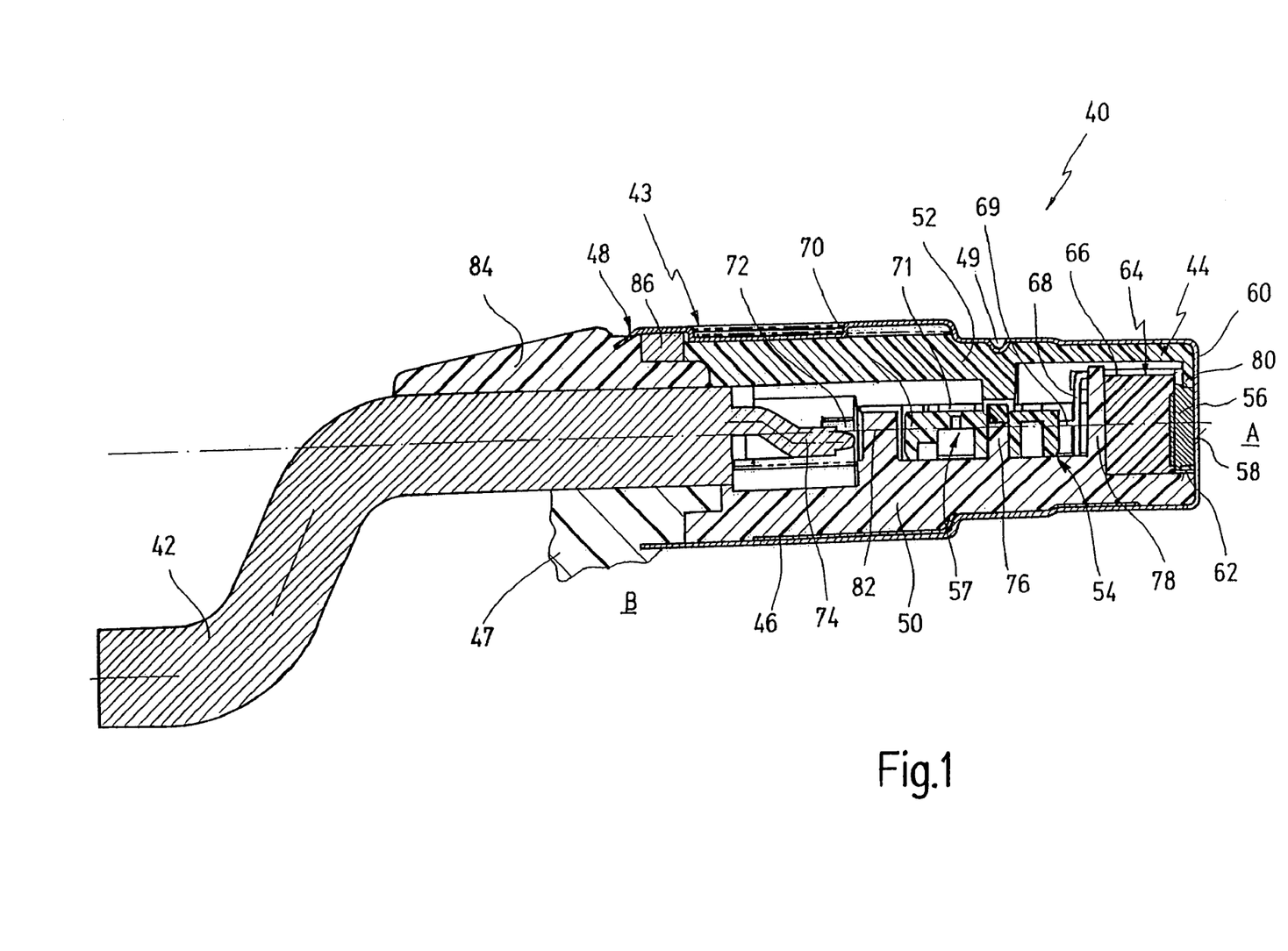
FIG. 1 shows a longitudinal sectional view through a first embodiment of a sensor cartridge according to the present invention.
Figure 2:
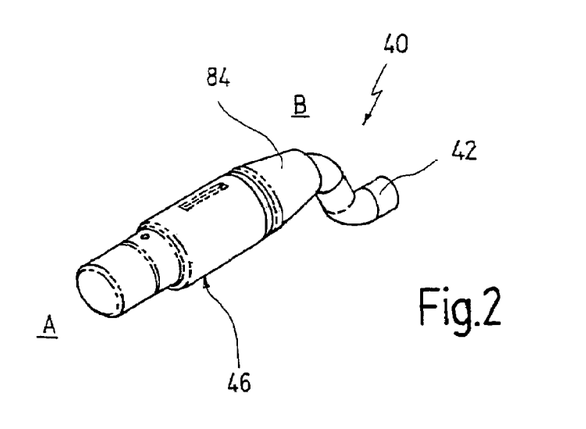
FIG. 2 shows a perspective illustration of the sensor cartridge of FIG. 1.
Figure 3:
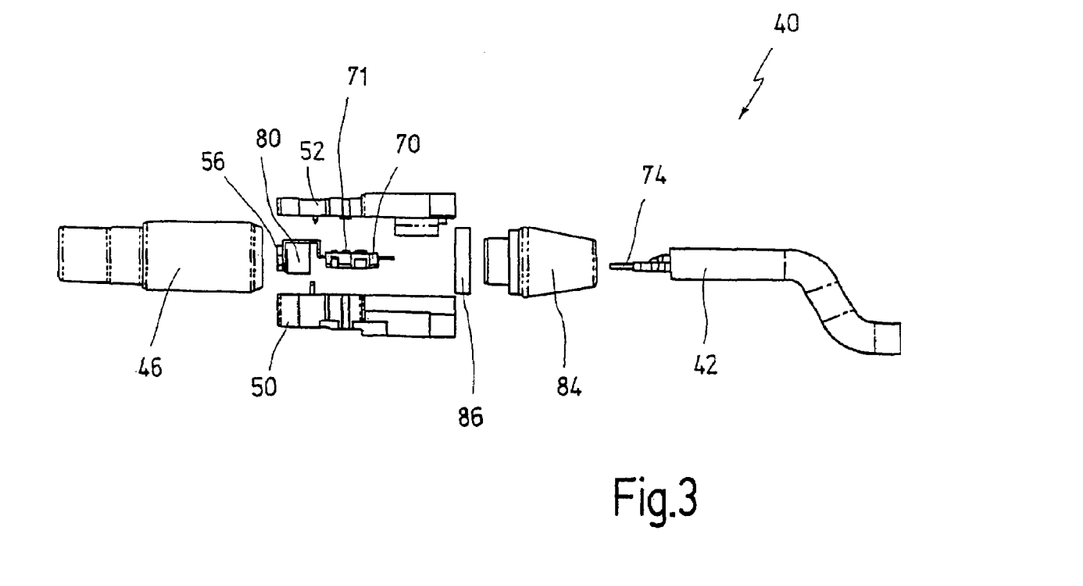
FIG. 3 shows an exploded view of the sensor cartridge of FIG. 1.
Figure 4:
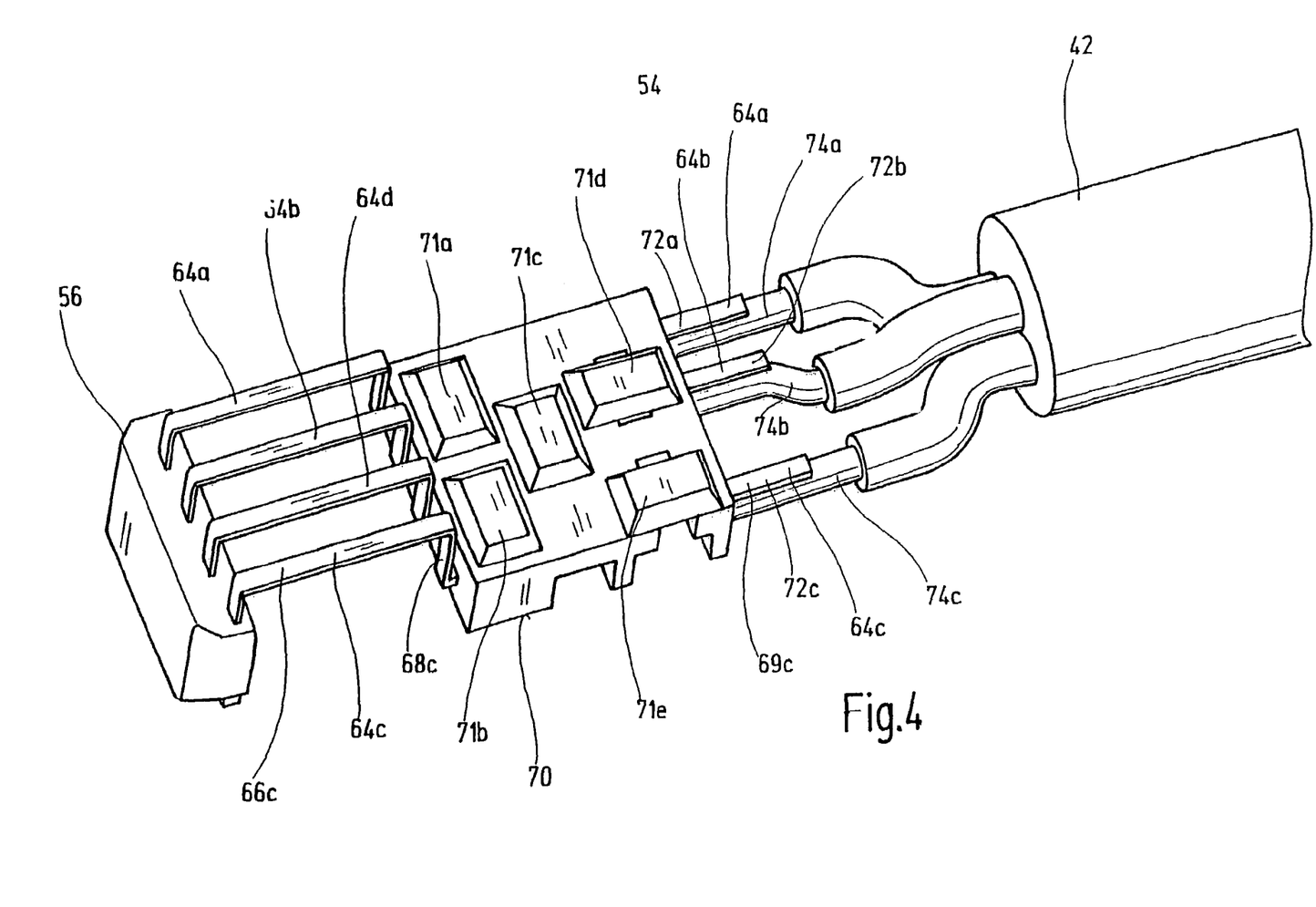
FIG. 4 shows a perspective illustration of the elements arranged inside the sensor cartridge.
Figure 5:
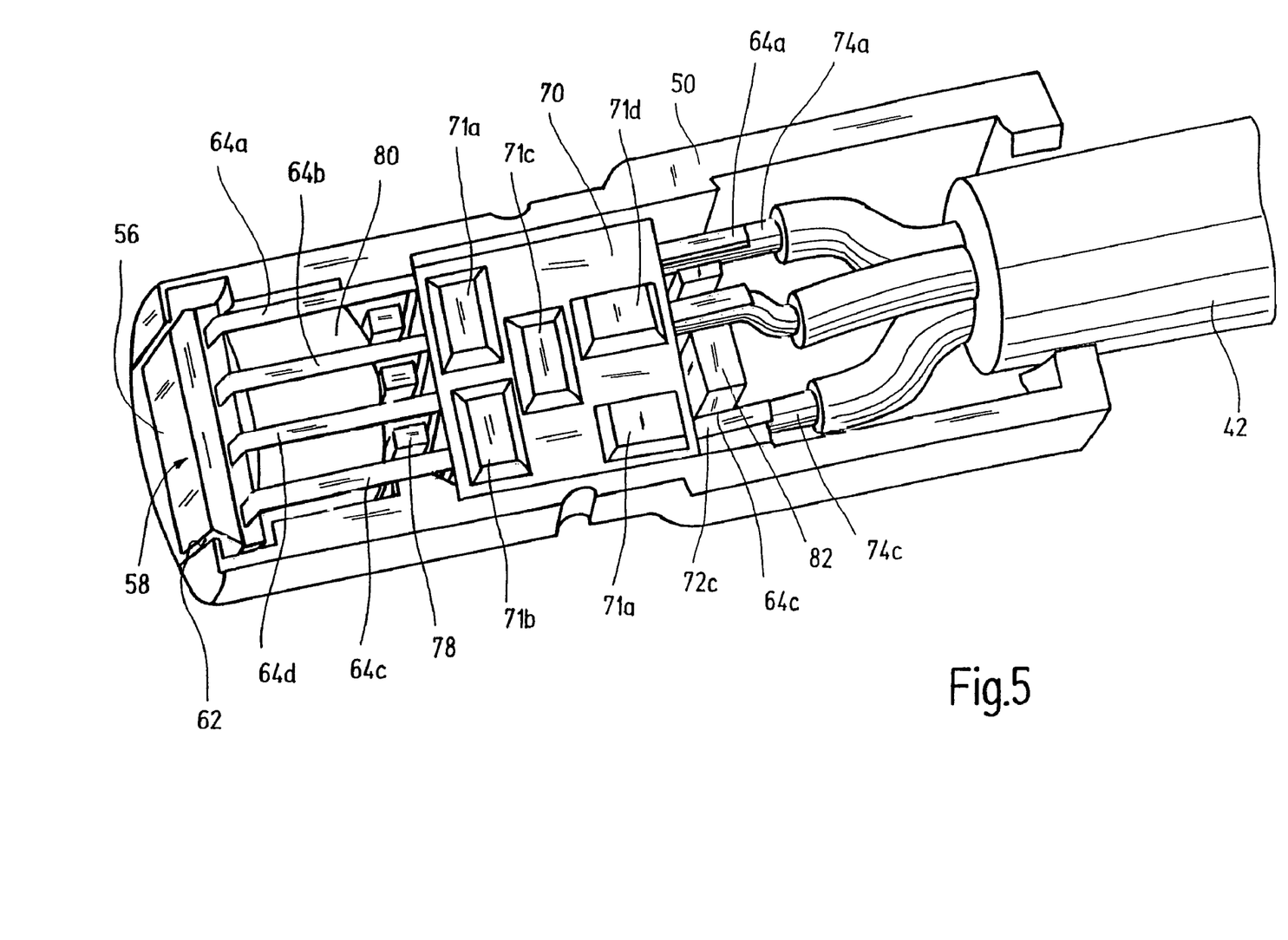
FIG. 5 shows the elements shown in FIG. 4, inserted into a lower part of a plastic carrier of the sensor cartridge of FIG. 1.

Alternatively to the arrangement in which the metal sleeve edge is flanged, an injection-molded surround may be provided in the region of the second end B, as shown diagrammatically at 47 in FIG. 1. The injection-molded surround may be produced, for example, from a plastic material, for example in the form of a macromelt surround.

As a result of this measure, too, tensile relief and sealing off can be achieved.

Furthermore, in the embodiment with the injection-molded surround, it is not necessary for the metal sleeve 46 to be flanged in the region of the second end B, so that the outlay in terms of production is reduced overall.

The plastic carrier 44 is of multipart, preferably two-part design. In the preferred embodiment illustrated, the plastic carrier 44 has a lower part 50 and a cover 52. The lower part 50 and the cover 52 are separated from one another by means of an approximately axially running parting plane.

The plastic carrier 44 receives a sensor unit 54. More precisely, the sensor unit is inserted into the lower part 50.

The sensor unit 54 contains a Hall sensor 56 and a measuring circuit 57.

The Hall sensor 56 is mounted in the plastic carrier 44 in the region of the first end A. The plastic carrier 44 has, in the region of the axial end A, an axial orifice 62 which points toward the bottom 60 of the metal sleeve 46. The Hall sensor 56 is mounted in an axially movable or floating manner within the plastic carrier 44 and has a sensor face 58. The Hall sensor 56 is mounted in the plastic carrier 44 in such a way that the sensor face 58 projects with respect to the orifice 62 and touches the bottom 60 of the metal sleeve 46.

The Hall sensor 56 has a plurality of terminal pins 64. The terminal pins extend out of the housing of the Hall sensor 56 initially in the radial direction and then merge directly into an axial portion 66. A radial portion 68 adjoins the axial portion 66. The radial portion 68 has adjoining it, in turn, a second axial portion 69 which is offset in parallel with respect to the first axial portion 66.

The second axial portion 69 is injection-molded around with a pin holder 70 consisting of plastic.

The pin holder 70 is provided with a plurality of recesses, not designated in any more detail, at which the terminal pins 64 are exposed. SMD structural elements 71 which form the measuring circuit 57 are inserted into these recesses. The measuring circuit 57 is thus implemented directly at the terminal pins 64 of the Hall sensor 56.

For example, varistor elements (for example, as SMD structural elements) may be soldered with their two contacts to a voltage supply pin, on the one hand, and to a ground pin, on the other hand.

Furthermore, for a series connection of components of the measuring circuit 57, the pin holder 70 may be formed by plastic injection-molding in the region of a receptacle or recess such that the terminal pins 64 are separated. A component (for example, a ferrite component) then inserted into this recess can then be connected in series.

Ends 72 of the terminal pins 64 project in the axial direction with respect to the pin holder 70, so that they can be contacted by conductors 74 of the junction cable 42.

A first radial web 76 is formed on the plastic carrier 44, more precisely on the lower part 50. The first radial web 76 engages into a recess provided on the underside of the pin holder 70. The pin holder 70 is thereby secured to the plastic carrier 44 in the axial direction.

Furthermore, the plastic carrier 44, more precisely the lower part 50, has a second radial web 78 which lies nearer the first end A. The second radial web 78 runs approximately parallel with respect to the radial portion 68 of the terminal pins 64 and serves for the axial support of a silicone cushion 80. The silicone cushion 80 is in this case inserted between the second radial web 78 and the Hall sensor 56. The silicone cushion 80 is dimensioned such that the Hall sensor 56 is prestressed elastically in the axial direction toward the first end A. It is thereby possible for the sensor face 58 to contact the bottom 60 of the metal sleeve 46 reliably and independently of tolerances of the plastic carrier 44 on account of the elastic prestress.

The elastic prestress by means of the silicone cushion 80 ensures that the sensor face 58 bears reliably against the bottom 60. Adhesive bonding between the metal sleeve 46 and the Hall sensor 56 is therefore unnecessary.

Furthermore, it goes without saying that any other desired means for providing elastic prestress may be provided instead of a silicone cushion 80.

Although adhesive bonding between the metal sleeve 46 and the Hall sensor 56 is generally unnecessary, such adhesive bonding is nevertheless preferably carried out. Temperature drifts can thereby be avoided. Moreover, higher vibration safety or reliability in the case of vibrations which occur is obtained.

The elastic prestress may in this case be utilized in order to press the sensor face 58 firmly against the bottom 60 during the adhesive bonding operation.

Furthermore, on the plastic carrier 44, more precisely on the lower part 50, a third radial web 82 is provided, which is arranged nearer to the second end B. The third radial web 82 is provided with orifices (not illustrated) through which the ends 72 of the terminal pins 64 extend. The ends 72 which project with respect to the third radial web 82 can then be contacted by the conductors 74.

The third radial web 83 thus serves likewise for tensile relief and for this purpose is arranged between the pin holder 70 and the conductors 74.

The junction cable 42 is led in the region of the second axial end B through a sealing ring 84 which extends partially into the metal sleeve 46. Furthermore, in the region of the second axial end B, within the metal sleeve 46, a flanging support ring 86 is provided, which may be produced from a somewhat elastic material. The flanging support ring 86 serves for protecting the plastic carrier 44 during the flanging operation on the second axial end B (shown at 48). The flanging 48 in this case engages at the same time into the elastic sealing ring 84 and also consequently secures the latter positively to the metal sleeve 46.

During the flanging operation, the flanging forces are thus supported axially on the flanging support ring 86 which, in turn, presses axially against the plastic carrier 44 in the direction A.

The interior of the metal sleeve 46 is protected with respect to moisture and the like by means of the sealing ring 84.

As already mentioned above, as a rule, a sealing ring 84 is not necessary when the second end B of the sensor holder 40 is injected-molded around, as illustrated in FIG. 1 at 47. A flanging support ring 86, too, is not required in this case.

A particularly preferred production method for the production of the sensor cartridge 40 accordingly provides the following steps:

provision of a Hall sensor 56 having a plurality of terminal pins 64, bending (in particular, Z-shaped) of the terminal pins 64, injection-molding around of the terminal pins 64 with a pin holder 70, if appropriate, stamping out of portions of the terminal pin 64 in the region of receptacles of the pin holder 70, application of soldering paste to the terminal pins 64 in the region of the receptacles or orifices, equipping of the arrangement with electrical components 71 (for example, SMD components), electrical contacting of the components 71 by the terminal pins 64, for example by means of an SMG connection technique (soldering), in particular with hot air, contacting of those ends 72 of the terminal pins 64 which project with respect to the pin holder 70 by conductors 74 of a junction lead 42 (for example, by form welding), insertion of the sensor unit 54 thus formed into a lower part 50 of a plastic carrier 44, if appropriate together with a silicone cushion 80 for exerting axial pressure on the Hall sensor 56, placing of a cover 52 onto the lower part 50 of the plastic carrier 44, introduction of the plastic carrier 44 into a metal sleeve 46, flanging 48 of the open end of the metal sleeve 46, preferably an axial pressure being exerted on the plastic carrier 44 in the direction toward the bottom 60 of the metal sleeve 46.

Instead of the flanging step, an injection molding around the second end B may also take place.

Instead of the provision of a Hall sensor 56 having a plurality of terminal pins 64, a Hall sensor in the form of an SMD component may also be provided. In this case, a connection to conductors of a junction lead may be implemented, for example via a flexible connection device, such as a flexible line or a Starflex lead. A measuring circuit may be provided separately or be implemented directly on the flexible connection device.

Figure 6:
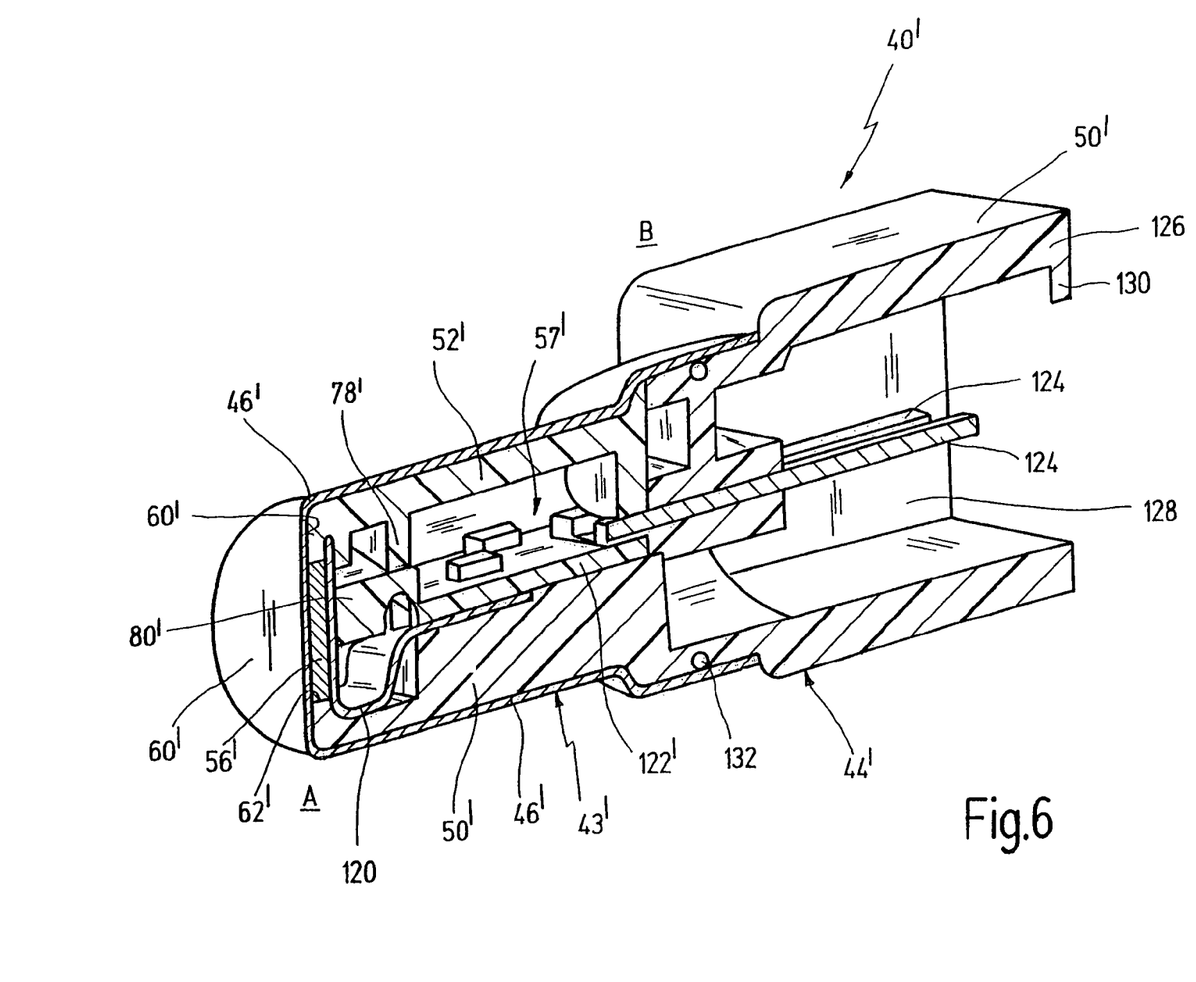
FIG. 6 shows a perspective longitudinal sectional view of a further embodiment of a sensor cartridge according to the present invention.

A sensor holder according to such an alternative embodiment of the invention is shown in general at 40' in FIG. 6.

The sensor holder 40' corresponds in its general construction and its general functioning to the sensor holder 40 of FIGS. 1 to 5. Only differences are explained below.

In the sensor holder 40', a sensor component in the form of a Hall sensor 56' is designed as an SMD component. A sensor face, not designated in any more detail, of the Hall sensor 56' is pressed, in particular adhesively bonded, onto the bottom 60' of a metal sleeve 46'.

Junction pads are provided on the opposite face of the Hall sensor 56 and are contacted onto a flexible flat connection device 120 in the form of what is known as a flexible film.

The flexible film 120 is oriented radially within the plastic carrier 44' in the region of the Hall sensor 56'. This radial portion has adjoining it an axial portion. The latter has adjoining it, in turn, a radial portion and finally also an axial portion. The axial portion is connected electrically to a circuit board 122 which is mounted, oriented axially, within the plastic carrier 44'.

The arrangement consisting of the Hall sensor 56', flexible film 120 and circuit board 122 may be preassembled. At least part of a measuring circuit 57' can be implemented on the circuit board 122.

A plurality of contact pins 124 are attached to that end of the circuit board 122 which lies opposite the bottom 60' and extend in the axial direction toward the second end B.

The plastic carrier 44' is of two-part design, with a lower part 50' and with a cover 52.

The lower part 50' has an extension 126 extending beyond the second end B. The extension 126 extends out of the metal sleeve 46' and forms a cavity 128 into which the contact pins 124 extend.

The cavity 128 is designed as a plug connector receptacle for the introduction of a plug connector, not illustrated. The plug connector itself may in this case be connected to the conductors of the junction cable.

Furthermore, on the extension 126, a latching web 130 is formed, which is designed for receiving the plug connector in the cavity 128 in a latching manner. Instead of the latching web 130, of course, a corresponding latching depression may also be provided.

The plug connector, not illustrated, has connecting sockets for receiving the contact pins 124, in order thereby to connect the conductors of the junction cable to the circuit board 122 and consequently also to the Hall sensor 56'.

In the region between the circuit board 122 and the Hall sensor 56', the plastic carrier 44' has formed on it a radial web 78' having an orifice into which a silicone cushion 80' is inserted, in order to mount the latter on the plastic carrier 44', in particular on the cover 52'.

Finally, the plastic carrier 44' has formed on it, on the outer circumference, a recess for receiving an O-ring 132, by means of which the metal sleeve 46' is sealed off with respect to the plastic carrier 44'.

In the embodiment illustrated, the O-ring is formed on a portion of the lower part 50' which is arranged within the metal sleeve 46' and forms a transition between the cover 52' and the extension 126.

Finally, the idea of a composition component consisting of a plastic carrier and of a metal sleeve can also be applied to a component by means of which a permanent magnet is mounted within a sensor arrangement.

In this case, the magnet is inserted or snapped onto a plastic carrier, for example, in a latching manner or otherwise elastically. The metal sleeve is subsequently pushed over it, so that the permanent magnet lies in the region of the bottom of the metal sleeve. A flanging operation subsequently takes place again, so that the permanent magnet is pressed against the inside of the bottom of the sleeve in the axial direction.

Although, in the preferred embodiment described above, in general, an axially movable mounting of the Hall sensor 56 on the plastic carrier 44 is assumed, it is also possible to secure the Hall sensor immovably to the plastic carrier. In this case, the pressing of the projecting Hall sensor against the bottom of the metal sleeve 46 may take place, for example, by means of the flanging force.

Figure 7:
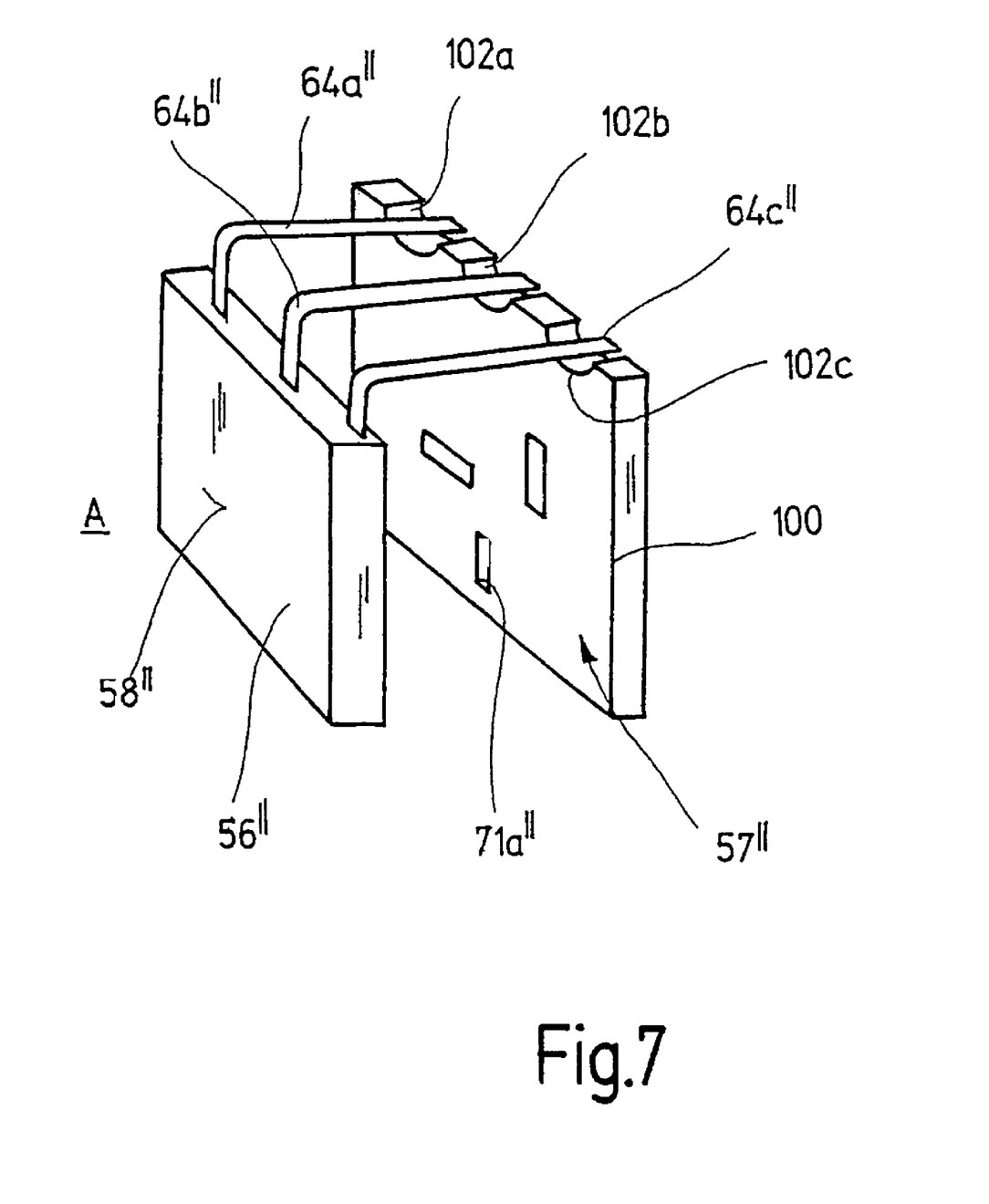
FIG. 7 shows a perspective illustration of an arrangement of a Hall sensor and of a measuring circuit board according to an alternative embodiment of the invention.

FIG. 7 shows an alternative embodiment of an arrangement according to the invention of a Hall sensor 56" and of a measuring circuit 57".

It is assumed, here, that the Hall sensor 56" is mounted, in general, in a vertical orientation on any desired carrier, in such a way that the sensor face 58' of said Hall sensor points toward an axial end A.

The terminal pins 64" project out of the housing of the Hall sensor 56" in the radial direction and are subsequently bent in the axial direction.

The measuring circuit 57" is formed on a separately provided circuit board 100.

The circuit board 100 is oriented approximately parallel with respect to the Hall sensor 56" and consequently extends in the radial direction. A plurality of depressions, in particular semicircular depressions 102, are formed on one edge of the circuit board 100. The terminal pins 64" are introduced into the depressions 102 and are contacted electrically there, for example by soldering.

The circuit board 100 can be produced, for example, from a basic circuit board which, for example, possesses the dimensions of two circuit boards 100 and which is provided with circular through contactings at a separation limit. By the basic circuit board being separated along this separation limit, the semicircular metal-plated depressions 102, illustrated in FIG. 7, are obtained, which are suitable for the reception and electrical contacting of the terminal pins 64".

It goes without saying, however, that the circuit board 100 may, if appropriate, also have circular through contactings into which the terminal pins 64" are introduced in a way conventional per se.

While the present invention has been particularly shown and described with reference to certain embodiments thereof, it will be understood by those of ordinary skill in the art that various changes in form and details may be made therein without departing from the spirit and scope of the present invention.

What is claimed is:

1. A sensor holder, comprising an elongate holding device and first and second axial ends, the holder configured to receive at the first axial end a sensor comprising one or more terminals and to receive at the second axial end a junction cable comprising one or more conductors, the holder being configured to electrically connect the one or more conductors of the junction cable to the one or more terminals of the sensor, wherein the holding device comprises:
   a plastic carrier;
   a metallic outer carrier partially surrounding the plastic carrier; and
   a cushion configured to prestress the sensor in the axial direction toward the first axial end, wherein the sensor is mounted floatingly in the axial direction on the plastic.

2. The sensor holder as claimed in claim 1, wherein a first end of the metallic outer carrier, near the first axial end, is closed.

3. The sensor holder as claimed in claim 1, wherein the metallic outer carrier comprises a flanging, whereby the plastic carrier is secured to the metallic outer carrier.

4. The sensor holder as claimed in claim 2, wherein a second end of the metallic outer carrier is configured to receive the junction cable.

5. The sensor holder as claimed in claim 4, wherein a sealing ring substantially surrounds the junction cable in a region near the second end of the metallic outer carrier.

6. The sensor holder as claimed in claim 1, further comprising an injection-molded surround near the second end of the metallic outer carrier.

7. The sensor holder as claimed in claim 1, wherein the plastic carrier comprises a lower part and a cover, the lower part and the cover being separated by an approximately axially running parting plane.

8. The sensor holder as claimed in claim 1, wherein the plastic carrier comprises a first radial web for tensile relief.

9. The sensor holder as claimed in claim 1, wherein the sensor is mounted immovably on the plastic carrier.

10. The sensor holder as claimed in claim 1, wherein the plastic carrier has at the first axial end an orifice, and the sensor projects axially toward the closed portion of the metallic outer carrier.

11. The sensor holder as claimed in claim 1, wherein a circuit board comprising a measuring circuit is mounted on the plastic carrier.

12. The sensor holder as claimed in claim 1, wherein the cushion is supported in the axial direction on a radial web.

13. The sensor holder as claimed in claim 1, wherein the plastic carrier comprises an orifice near the first axial end, and a sensor face of the sensor projects axially into the orifice.

14. The sensor holder as claimed in claim 1, wherein the sensor includes a plurality of terminal pins and a pin holder formed by plastic injection-molding configured to separate the terminal pins.

15. The sensor holder as claimed in claim 1, wherein the junction cable is connected to a plug connector, and wherein the plastic carrier has a plug connector receptacle for the introduction of the plug connector.

16. The sensor holder as claimed in claim 1, wherein the plastic carrier has an extension which protrudes out of the metallic outer carrier near the second axial end.

17. The sensor holder as claimed in claim 1, wherein the sensor is a surface mount device (SMD) component.

18. The sensor holder as claimed in claim 1, wherein a flexible flat connection device electrically connects the sensor and a measuring circuit.

19. A sensor holder, comprising:
   an elongate holding device;
   first and second axial ends, wherein the holder is configured to receive at the first axial end a sensor comprising one or more terminals and to receive at the second axial end a junction cable comprising one or more conductors, the holder further configured to electrically connect the one or more conductors of the junction cable to the one or more terminals of the sensor, wherein the sensor is mounted floatingly in the axial direction on a plastic carrier; and
   a cushion supported in the axial direction by a radial web, the cushion configured to prestress the sensor in the axial direction toward the first axial end.

20. The sensor holder as claimed in claim 19, wherein the cushion comprises silicone.

21. A sensor holder, comprising:
   an elongate holding device;
   first and second axial ends, the holder configured to receive at the first axial end a sensor comprising one or more terminals and to receive at the second axial end a junction cable comprising one or more conductors, the holder further configured to electrically connect the one or more conductors of the junction cable to the one or more terminals of the sensor;

a plastic carrier comprising an orifice near the first axial end, wherein the sensor is mounted floatingly in the axial direction on the plastic carrier and a sensor face of the sensor projects axially into the orifice; and a cushion configured to prestress the sensor in the axial direction toward the first axial end.

22. A sensor holder, comprising:

an elongate holding device;

first and second axial ends, the holder configured to receive at the first axial end a sensor comprising one or more terminals and to receive at the second axial end a junction cable comprising one or more conductors, the holder further configured to electrically connect the one or more conductors of the junction cable to the one or more terminals of the sensor;

a plastic carrier, wherein the sensor is mounted floatingly in the axial direction on the plastic carrier; and a cushion configured to prestress the sensor in the axial direction toward the first axial end, wherein the sensor includes a plurality of terminal pins and a pin holder formed by plastic injection-molding configured to separate the terminal pins.

23. The sensor holder as claimed in claim 22, wherein the pin holder comprises at least one recess and at least one terminal pin is exposed within the at least one recess.

24. The sensor holder as claimed in claim 23, wherein an electrical component is located at least partially within the recess and contacts the terminal pin.

25. The sensor holder as claimed in claim 22, wherein an end of the terminal pin projects from the pin holder and is electrically connected to a conductor of the junction cable.

26. The sensor holder as claimed in claim 22, wherein the pin holder includes a depression, and a radial web of a plastic carrier engages into the depression so as to provide tensile relief.

27. The sensor holder as claimed in claim 22, wherein the holder includes another radial web with orifices through which an end of the terminal pin protrudes, the end of the terminal pin projecting from the pin holder.

28. A method of manufacturing a sensor holder, the method comprising:

providing a sensor having terminals;

connecting one or more terminals of the sensor to conductors of a junction cable;

inserting the sensor into a plastic carrier;

injection-molding around one or more terminal pins of the terminals so as to form a pin holder comprising plastic;

inserting an electrical component into a recess in the pin holder, wherein the pin holder comprises an exposed terminal pin, and the electrical component is electrically connected to the terminal pin; and enclosing the plastic carrier with a metallic outer carrier.

29. The method as claimed in claim 28, further comprising connecting the sensor to a measuring circuit inside the plastic carrier with a flat flexible connection device.

* * * * *